United States Patent [19]

Nihei

[11] Patent Number: 4,586,869
[45] Date of Patent: May 6, 1986

[54] INDUSTRIAL ROBOT HAND
[75] Inventor: Ryo Nihei, Musashino, Japan
[73] Assignee: Fanuc, Ltd., Tokyo, Japan
[21] Appl. No.: 491,199
[22] PCT Filed: Aug. 25, 1982
[86] PCT No.: PCT/JP82/00335
  § 371 Date: Apr. 25, 1983
  § 102(e) Date: Apr. 25, 1983
[87] PCT Pub. No.: WO83/00651
  PCT Pub. Date: Mar. 3, 1983
[51] Int. Cl.[4] ............................................. B25J 17/02
[52] U.S. Cl. ..................................... 414/736; 294/86.4; 901/39
[58] Field of Search .................. 269/203, 152, 45, 17; 29/568; 294/87 R, 86 R; 414/736, 730, 589, 590; 901/31, 36, 39, 29, 50, 22

[56] References Cited
U.S. PATENT DOCUMENTS

| | | | |
|---|---|---|---|
| 2,486,294 | 10/1949 | Kearney et al. | 269/203 X |
| 2,879,059 | 3/1959 | Sandefur | 269/17 |
| 3,109,535 | 11/1963 | Norwood | 269/203 X |
| 4,239,196 | 12/1980 | Hanger | 269/17 |
| 4,302,144 | 11/1981 | Hallqvist | 414/590 |
| 4,344,220 | 8/1982 | Sachot | 414/736 X |
| 4,439,090 | 3/1984 | Schaeffer | 414/590 X |

FOREIGN PATENT DOCUMENTS 844266 7/1981 U.S.S.R. ............................ 901/22 X

Primary Examiner—Terrance L. Siemens
Attorney, Agent, or Firm—Armstrong, Nikaido, Marmelstein & Kubovcik

[57] ABSTRACT

A robot hand to be joined in use to the free end of an industrial robot wrist unit (10) is provided with a right and left work gripping units (28b and 28a) having pairs of work gripping fingers (30b and 30a), respectively, and separately disposed on the right and the left sides of a hand base, and an offset adjusting mechanism (34, 36, 40 and 42) for fastening the hand base with fastening means after the completion of the lateral adjustment of the hand base by a desired degree with respect to the wrist unit (10).

4 Claims, 2 Drawing Figures

INDUSTRIAL ROBOT HAND

FIELD OF THE INVENTION

The present invention relates to a robot hand designed to be joined to the free end of the rotary wrist unit of an industrial robot and, more particularly, to an improved construction of a robot hand, which improvement contributes to improving the working efficiency of the industrial robot employed in combination with a machine tool.

BACKGROUND ART

The combination use of an industrial robot and machine tool, particularly an automatic machine tool such as an automatic lathe, is a technique widely employed to save labor and improve processing efficiency. Continuous unattended operation of an automatic lathe, for instance, is attained by having an industrial robot mount a work on the chuck of the automatic lathe, remove the work from the chuck after machining, return the machined work to the work table, then repeat the same mounting and removing operation. In such a machining operation, a double-hand type robot hand is often employed. The double-hand type robot hand is provided with right and left gripping units each adapted to perform individual work gripping operations. The right and left gripping units alternately grip a blank and a machined work so that the work replacing operation is attained sequentially, whereby the idle time of the machine tool is reduced to the minimum possible. In the operation of an industrial robot employing such a double-hand type robot hand, the industrial robot operates in accordance with commands provided by a robot control system to bring the right and left gripping units to positions opposite the chuck of a machine tool, such as an automatic lathe, by turning the wrist unit carrying the robot hand and performs work gripping and work replacing works. However, the right and left gripping units of the robot hand cannot be brought to the appropriate positions merely by turning the wrist unit 180° since the work not yet machined and the machined work differ from each other in size and shape. This inconvenience may be eliminated by the measure of adapting the robot work command, which is taught beforehand to the robot control system, to the required robot work. It would, however, be extremely convenient if this inconvenience could be eliminated simply through the control of the robot hand.

DISCLOSURE OF THE INVENTION

Accordingly, it is an object of the present invention to provide an industrial robot hand capable of displacing and adjusting the right and left gripping units of a double-hand type robot hand to an appropriate position with respect to the machine tool and corresponding to the difference of size and shape between work not yet machined and machined work.

According to the present invention, in an industrial robot hand joined to the free end of a wrist unit and having right and left work gripping units each having a pair of work gripping swing fingers, an offset adjusting mechanism for laterally moving the right and left gripping units for positional adjustment and fixing the same at an appropriate position is provided between the right and left gripping units and the free end of the wrist unit.

BEST MODE OF CARRYING OUT THE INVENTION

Figure 1:
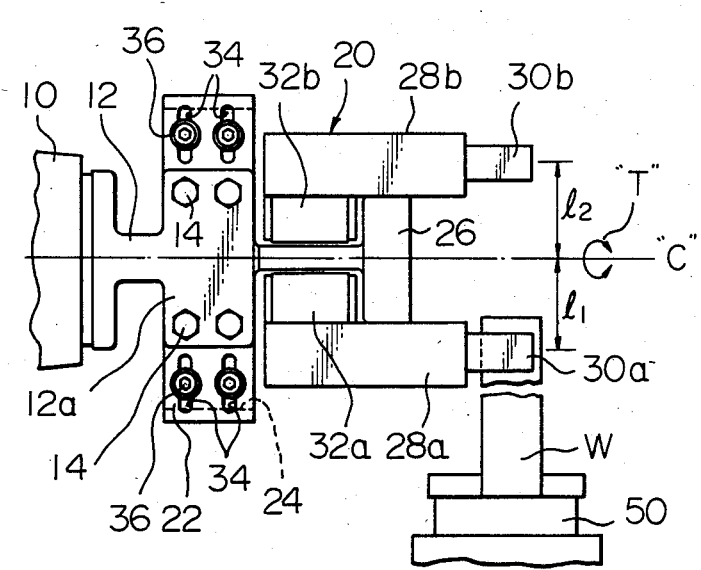
FIG. 1 is a plan view of an industrial robot hand in accordance with the present invention as joined to a rotary wrist unit.

Referring first to FIG. 1, a robot hand 20 in accordance with the present invention is joined to the wrist unit 10 of an industrial robot by means of a well-known safety coupling 12. The rotary wrist unit 10 and the robot hand 20 are fastened together by interposing an attaching plate 22 between the plate bracket 12a of the safety coupling 12 and a plate bracket 24 formed in the rear part of the hand base 26 of the robot hand 20 and, then, fastening those three parts with bolts 14 and other bolts 36. The rotary wrist unit 10 is capable of turning through a desire angle in the direction of the arrow T about the center axis of rotation C on the basis of a turning command provided by a robot control system, not shown. The robot hand 20 joined to the free end of the wrist unit by means of the safety coupling 12 thereby turns also through the same angle together with the wrist unit 10. The robot hand 20 has a first gripping unit 28a and a second gripping unit 28b on the left and right sides, respectively, of the hand base 26 thereof. The gripping units 28a and 28b have a pair of swing fingers 30a and a pair of swing fingers 30b, respectively, for gripping works with the swing fingers 30a and 30b. Thus, the provision of two gripping units 28a and 28b for the robot hand 20 makes the robot hand 20 a double-hand type robot hand. Solenoid valves 32a and 32b associated with the gripping units 28a and 28b, respectively, are controlled individually for the individual swing operation of the swing fingers 30a and 30b so that the pairs of swing fingers 30a and 30b grip works individually. FIG. 1 illustrates the robot hand 20 in a stage of its operation, in which the swing fingers 30a have been positioned opposite the chuck 50 of a machine tool and in which a work W not yet machined is mounted on the chuck 50, the distance between the center axis of rotation C of the rotary wrist unit 10 and the center line of the swing fingers 30a being l1 while the distance between the center axis C and the center line of the swing fingers 30b being l2. When l1=l2, provided the robot work command is programmed and taught to the robot control system so that the second gripping unit 28 removes the work W from the chuck 50 after the completion of the machining operation and the first gripping unit 28a receives the next work W not yet machined from a work table, not shown, during the machining operation before exchanging the works to be prepared for the next machining, since the machined work is reduced in length through machining, the second gripping unit 28b cannot reach the work machined and held by the chuck 50 when the wrist unit is merely turned 180°. Therefore, the second gripping unit 28b cannot grip the machined work. According to the present invention, the second gripping unit 28b is offset beforehand to provide a relationship l2>l1 and a robot work command is taught beforehand to the robot control system, whereby the second gripping unit 28b can reach the machined work and the swing fingers 30b can grip the machined work, notwithstanding the difference in length between the machined work and the work not yet machined.

Figure 2:
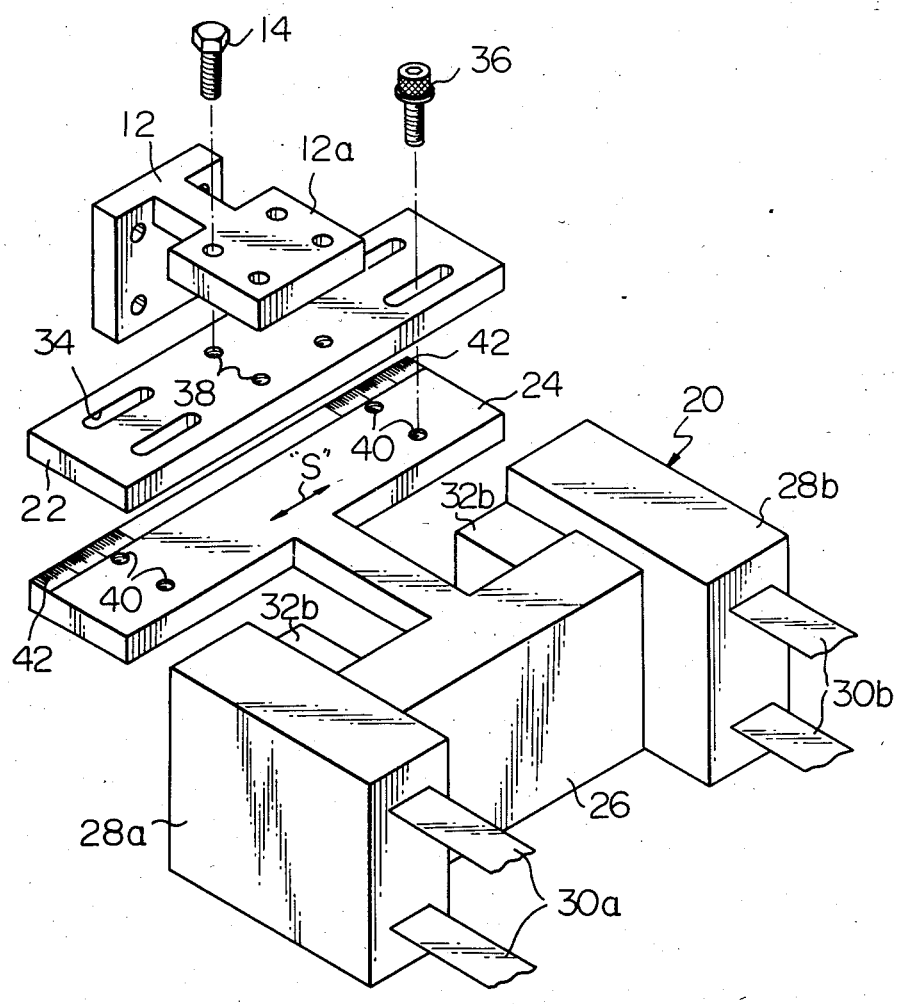
FIG. 2 is an enlarged exploded view of the industrial robot hand of FIG. 1.
Figure 3:
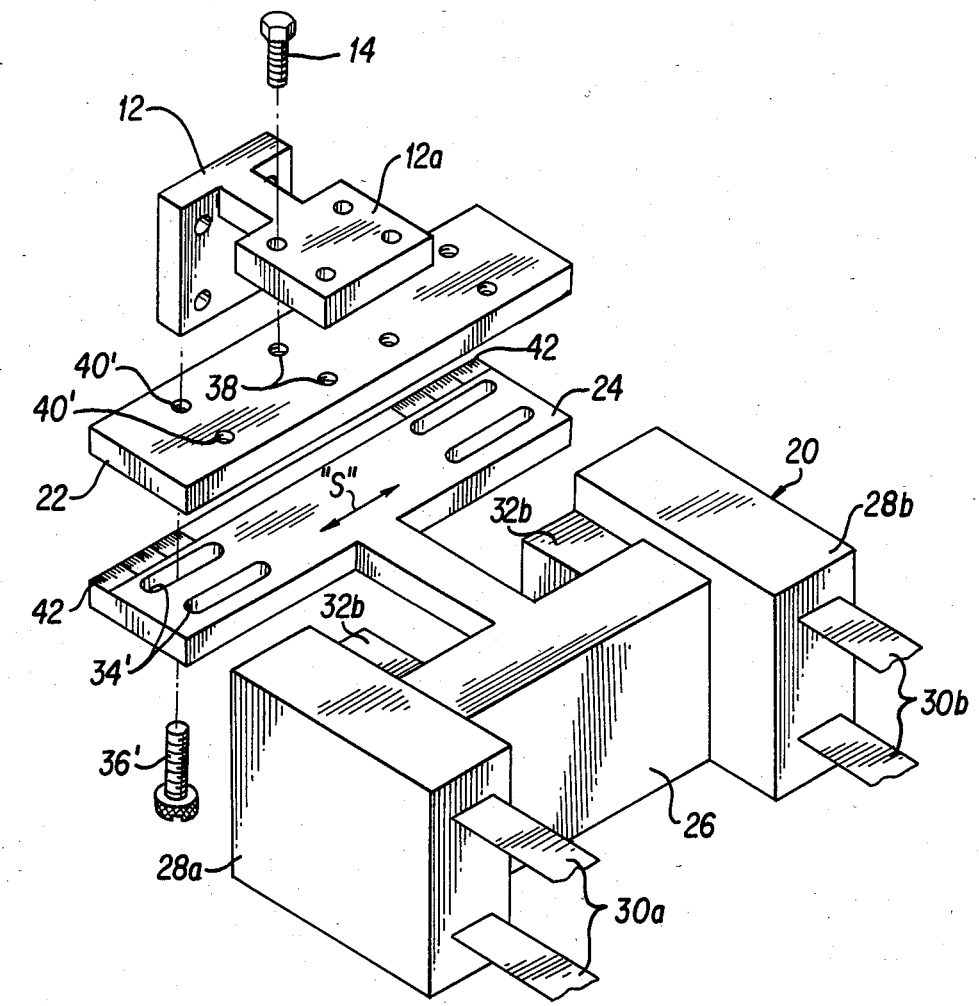

The offset mechanism of the robot hand 20 for establishing an offset state will be described hereunder referring to FIG. 2. As obvious from FIG. 2, the safety coupling 12 and the attaching plate 22 are fastened together with bolts 14, wherein the bolts 14 are inserted through through holes formed in the safety coupling 12 and are screwed into threaded holes 38. The attaching plate 22 and the plate bracket 24 of the hand base 26 are fastened together with bolts 36. The bolts 36 are inserted through slots 34 and are screwed into threaded holes 40 formed in the plate bracket 24. Therefore, the hand base 26 can be moved laterally (along directions shown by the double-head arrows S) for positional adjustment with respect to the center axis of rotation of the wrist unit to establish the hand base at an appropriate position. Adjusting the hand base 26 to a suitable position is facilitated, for example, by visually reading the degree of offset by means of graduations 42 marked beforehand on the surface of the plate bracket 24 and reference graduations marked on the backside of the attaching plate 22 as shown in FIG. 2. In machining works of various sizes and shapes in lots, when works of a specific kind are machined in lots, the offset adjusting operation is accomplished favorably and quickly by resetting the degree of offset of the robot hand 20 with reference to the graduations 42.

While the present invention has been described with reference to a preferred embodiment thereof, it is obvious that the present invention is capable of significantly contributing to improving the reliability of the industrial robot in saving labor, since the robot hand is allowed to grip a work correctly in mounting and removing the work.

I claim:

1. An industrial robot hand adapted to be joined to the free end of a robot wrist unit, said free end having an axis of rotation, said hand comprising:
    a hand base having a center axis parallel to said axis of rotation and left and right sides, relative to said center axis,
    left and right work gripping units disposed separately, respectively on said left and right sides of said band base for gripping unmachined and machined workpieces, respectively, different in size and shape from one another, each gripping unit having a pair of work gripping swing fingers, and
    means for fastening said hand base to said free end including an offset adjusting means for adjusting and laterally offsetting said center axis of said hand base relative to said axis of rotation of said free end.

2. An industrial robot hand according to claim 1, wherein said free end includes a first plate bracket; said hand base includes a second plate bracket having threaded holes therein; and said offset adjusting means includes an attaching plate member fixed to said first plate bracket and having slots therein, and screw means inserted through said slots into said threaded holes.

3. An industrial robot hand according to claim 1, wherein said free end includes a first plate bracket; said hand base includes a second plate bracket; and said offset adjusting means includes an attaching plate member fixed to said first plate bracket and having threaded holes therein, slots in said second bracket, and screw means inserted through said slots into said threaded holes.

4. An industrial robot hand according to any one of claims 1, 2 or 3, wherein said offset adjusting means is provided with indicia-marked graduations for allowing visual recognition of the degree of offset of said hand base.

* * * * *

UNITED STATES PATENT AND TRADEMARK OFFICE
CERTIFICATE OF CORRECTION

PATENT NO.   : 4,586,869

DATED        : May 6, 1986

INVENTOR(S)  : Ryo NIHEI

It is certified that error appears in the above-identified patent and that said Letters Patent is hereby corrected as shown below:

On the cover page, before Item [51] the following should be inserted:
--[30]            Foreign Application Priority Data
  August 25, 1981 [JP]   Japan....................56-132072--.

Signed and Sealed this

Seventh Day of October, 1986

[SEAL]

Attest:

DONALD J. QUIGG

Attesting Officer

Commissioner of Patents and Trademarks